(12) United States Patent
Prabhakar et al.

(10) Patent No.: US 11,845,811 B2
(45) Date of Patent: Dec. 19, 2023

(54) PROCESS FOR THE PREPARATION OF SUGAMMADEX SODIUM AND ITS NOVEL POLYMORPHIC FORM

(71) Applicant: NATCO PHARMA LIMITED, Hyderabad (IN)

(72) Inventors: Vanga Prabhakar, Hyderabad (IN); Baddula Saidulu, Hyderabad (IN); Kotte Rajashekar, Hyderabad (IN); Peddi Rajasekhara Reddy, Hyderabad (IN); Vuppalapati Naga Vasanta Srinivasu, Hyderabad (IN); Konduri Srinivasa Krishna Murthy, Hyderabad (IN); Budideti Shankar Reddy, Hyderabad (IN); Muddasani Pulla Reddy, Hyderabad (IN); Nannapaneni Venkaiah Chowdary, Hyderabad (IN)

(73) Assignee: NATCO PHARMA LIMITED, Hyderabad (IN)

( * ) Notice: Subject to any disclaimer, the term of this patent is extended or adjusted under 35 U.S.C. 154(b) by 0 days.

(21) Appl. No.: 17/278,296

(22) PCT Filed: Sep. 18, 2019

(86) PCT No.: PCT/IN2019/050681
§ 371 (c)(1),
(2) Date: Mar. 20, 2021

(87) PCT Pub. No.: WO2020/058987
PCT Pub. Date: Mar. 26, 2020

(65) Prior Publication Data
US 2021/0355248 A1 Nov. 18, 2021

(30) Foreign Application Priority Data
Sep. 20, 2018 (IN) .............................. 201841035487

(51) Int. Cl.
*C08B 37/16* (2006.01)
*C08B 37/00* (2006.01)

(52) U.S. Cl.
CPC ...... *C08B 37/0012* (2013.01); *C08B 37/0003* (2013.01); *C07B 2200/13* (2013.01)

(58) Field of Classification Search
None
See application file for complete search history.

(56) References Cited

U.S. PATENT DOCUMENTS

| | | | |
|---|---|---|---|
| 6,670,340 B1 * | 12/2003 | Zhang | ............ A61K 45/06 514/231.5 |
| RE44,733 E | 1/2014 | Zhang et al. | |
| 9,120,876 B2 | 9/2015 | Davuluri et al. | |
| 9,879,096 B2 | 1/2018 | Ravi et al. | |
| 10,336,835 B2 | 7/2019 | Liu et al. | |

FOREIGN PATENT DOCUMENTS

| | | |
|---|---|---|
| WO | 2012025937 A1 | 3/2012 |
| WO | 2014125501 A1 | 8/2014 |
| WO | 2016194001 A1 | 12/2016 |
| WO | 2017144734 A2 | 8/2017 |
| WO | 2017163165 A1 | 9/2017 |
| WO | 2018185784 A1 | 10/2018 |

OTHER PUBLICATIONS

Kurochkina, Russian Journal of Organic Chemistry, vol. 74, No. 10, 2004, pp. 1620-1622. (Year: 2004).*
CN107892727B, machine translation, Apr. 10, 2018. (Year: 2018).*
Stavroudis, WAAC Newsletter, vol. 28, No. 2, May 2006. (Year: 2006).*

* cited by examiner

*Primary Examiner* — Layla D Berry
(74) *Attorney, Agent, or Firm* — Mintz Levin Cohn Ferris Glovsky and Popeo, P.C.

(57) ABSTRACT

The present invention provides an improved process for the preparation of Sugammadex sodium of formula (I) having more than 98.5% purity along with less than 1.0% monohydroxy Sugammadex sodium and less than 0.15% any other known or unknown impurities by HPLC.

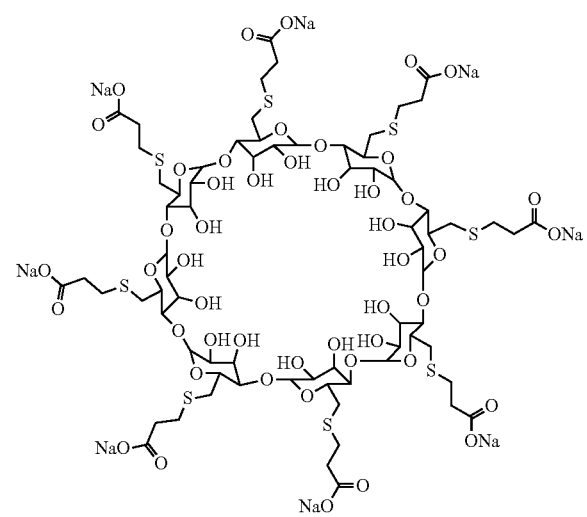

Formula-I

13 Claims, 2 Drawing Sheets

PROCESS FOR THE PREPARATION OF SUGAMMADEX SODIUM AND ITS NOVEL POLYMORPHIC FORM

FIELD OF THE INVENTION

The present invention relates to an improved process for the preparation of pharmaceutical grade Sugammadex sodium of formula (I). The chemical name of Sugammadex sodium is $6^A,6^B,6^C,6^D,6^E,6^F,6^G,6^H$-Octakis-S-(2-carboxyethyl)$6^A,6^B,6^C,6^D,6^E,6^F,6^G,6^H$-octathio-γ-cyclodextrin sodium salt. Sugammadex sodium of formula (I) is a white to off-white colour hygroscopic powder.

charged extensions electrostatically bind to the quaternary nitrogen of the target as well as contribute to the aqueous nature of the cyclodextrin.

Sugammadex sodium is the first selective relaxant binding agent (SRBA) for reversal of neuromuscular blockade by the agent rocuronium or vecuronium in general anaesthesia. It was approved in 2008 by EMEA and also approved in 2015 by USFDA. It is marketed in the form of a sterile solution for intravenous injection under the brand name Bridion® by Merck.

Sugammadex sodium of formula (I) was first disclosed in U.S. RE44,733E (U.S. Pat. No. 6,670,340). The US '733

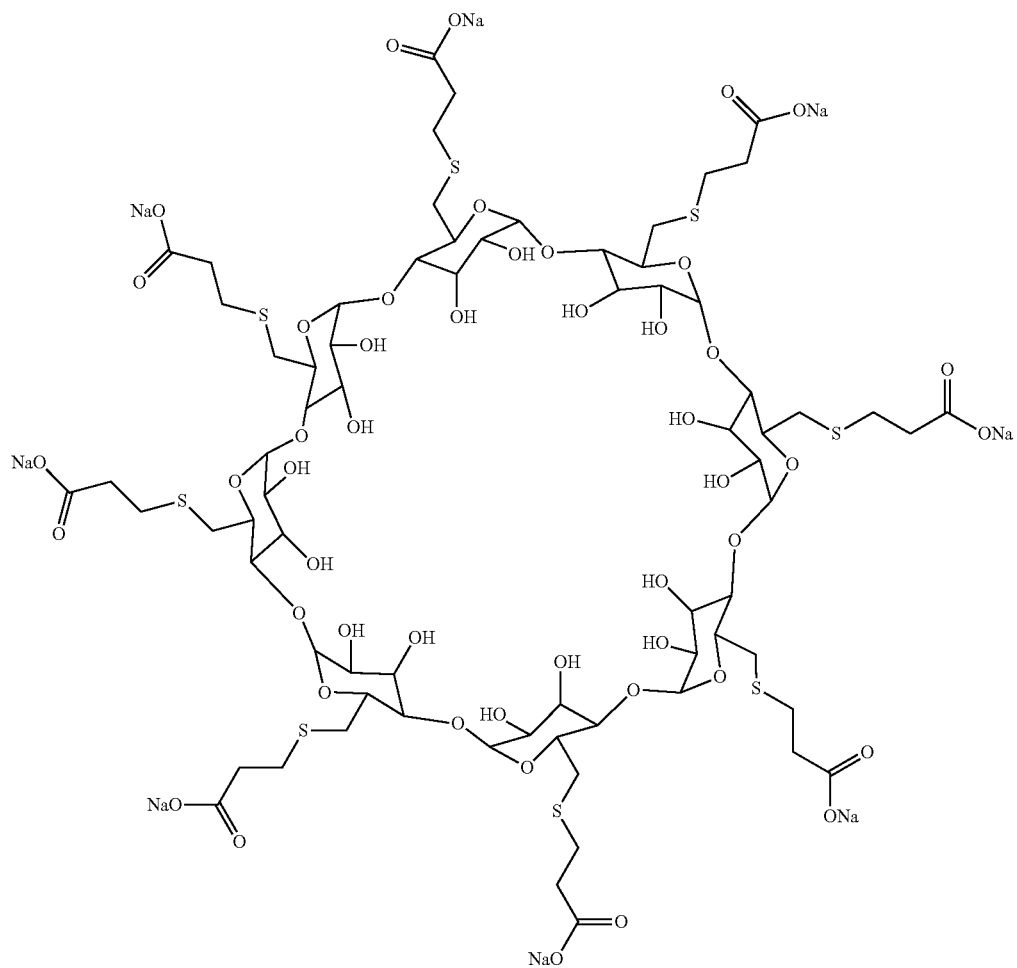

Formula I

BACKGROUND OF THE INVENTION

Sugammadex is a modified γ-cyclodextrin, with a lipophilic core and hydrophilic periphery. This γ-cyclodextrin has been modified from its natural state by placing eight carboxyl thio ether groups at the sixth carbon positions. These extensions extent the cavity size allowing greater encapsulation of the rocuronium molecule. These negatively discloses a process for the preparation of Sugammadex sodium of formula (I) by the reaction of γ-cyclodextrin of formula (II) with iodine in the presence of triphenylphosphine ($PPh_3$) in DMF solvent to produce Iodo-γ-cyclodextrin of formula (III). Further, the Iodo-γ-cyclodextrin of formula (III) is reacted with 3-mercaptopropionic acid in the presence of sodium hydride in DMF to give Sugammadex sodium of formula (I). The synthetic procedure is illustrated in Scheme-I as below:

Scheme-I

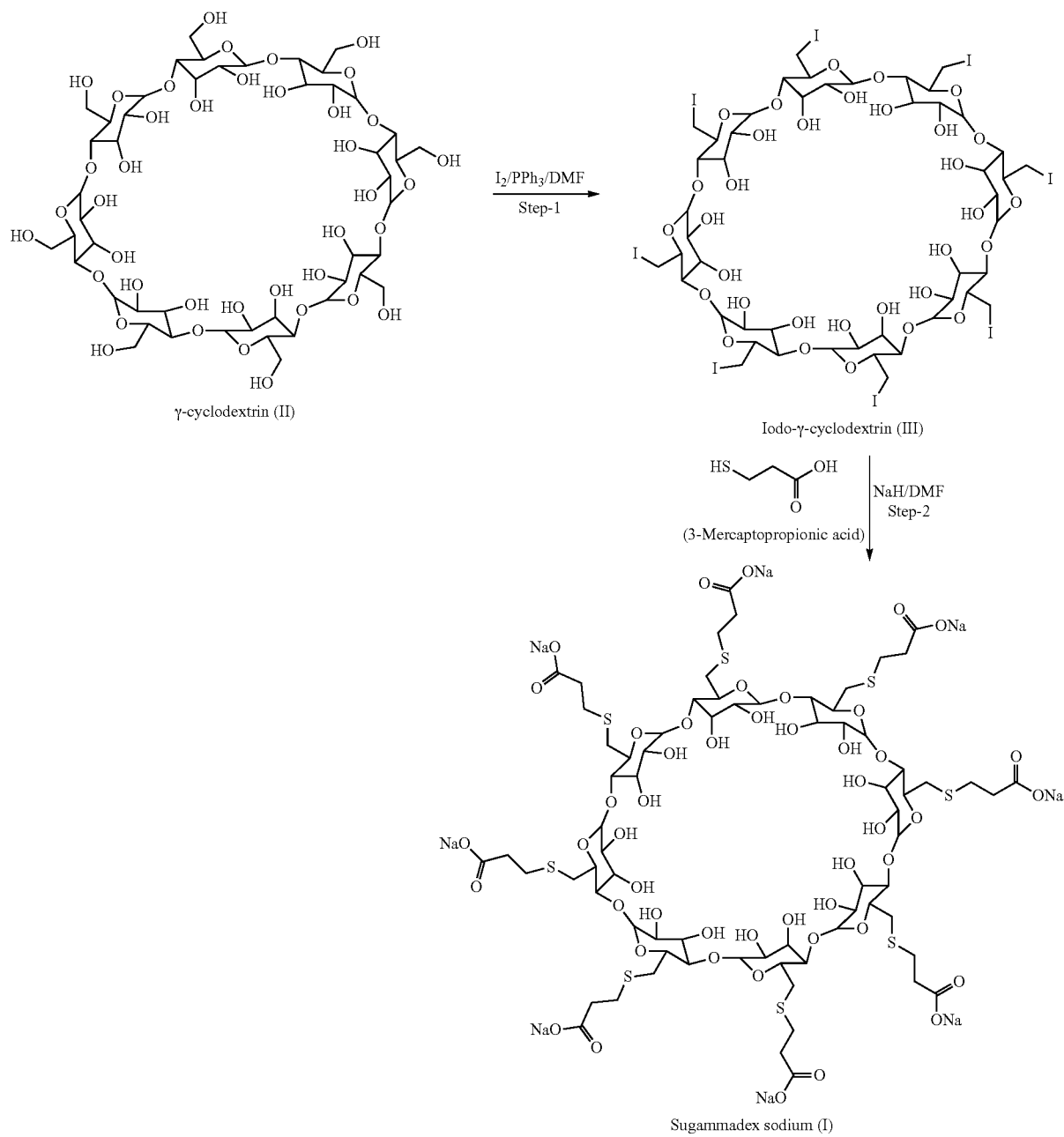

The process disclosed in U.S. RE44,733 E suffers from the following disadvantages outlined below:

Step-1: Iodination of γ-cyclodextrin
(i) Prolonged reaction times at elevated temperatures may form undesired over-iodinated impurities which are very difficult to eliminate from the purification process.
(ii) Highly expensive iodine is used in the process which is not viable on commercial scale.
(iii) Huge quantity of methanol is required.
(iv) No purity/impurity profile is disclosed in the process.

Step-2: Reaction of Iodo-γ-cyclodextrin (III) with 3-mercaptopropionic acid
(i) Handling of highly pyrophoric sodium hydride on commercial scale may pose safety issues.
(ii) Prolonged reaction times (~12 h) at elevated temperatures (~70° C.) may form many undesired impurities which are very difficult to eliminate from the purification process.
(iii) Process involves very cumbersome work-up procedure to isolate the product.
(iv) The process requires the distillation of high boiling point solvent such as DMF along with water, which is time and energy consuming.
(v) Membrane dialysis is not commercially viable and it requires special equipment and also time consuming.
(vi) No purity/impurity profile is disclosed in the process.
(vii) Yield of Sugammadex sodium produced with the above disclosed process is only 43%.

In another patent application, U.S. Pat. No. 9,120,876 discloses a process for the preparation of Sugammadex sodium of formula (I) by chlorination of γ-cyclodextrin of formula (II) with phosphorous pentachloride in DMF solvent, after completion of the chlorination the solvent was removed by distillation to afford viscous residue. The chlorinated γ-cyclodextrin of formula (IV) is isolated upon treatment with 5M sodium hydroxide at pH 8.0. The chlorinated γ-cyclodextrin of formula (IV) is further reacted with 3-mercaptopropionic acid in the presence of sodium hydride in DMF at 70-75° C. for 12 hours. The DMF is removed partially by distillation under vacuum and crude product isolated by adding ethanol. The crude product is further purified by silica gel and Sephadex G-25® column using water as eluent. The synthetic procedure is illustrated in Scheme-II as below:

Scheme-II

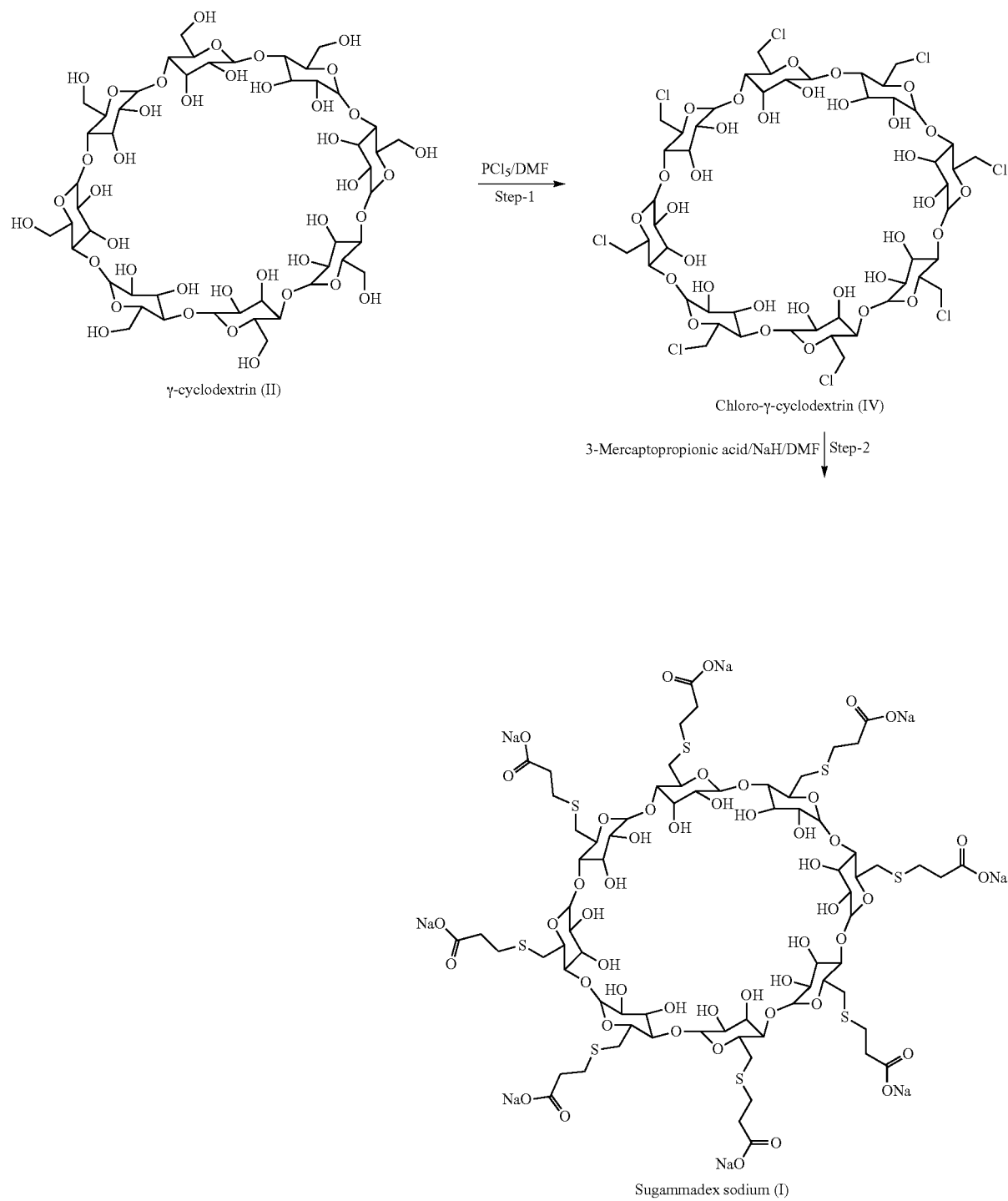

γ-cyclodextrin (II)

Chloro-γ-cyclodextrin (IV)

Sugammadex sodium (I)

The process disclosed in U.S. Pat. No. 9,120,876 suffers from the following disadvantages.

Step-1: Chlorination of γ-cyclodextrin:
(i) Prolonged reaction times (14 h) at elevated temperatures (65-70° C.) may form many undesired over-chlorinated impurities which are very difficult to eliminate from the purification process.
(ii) Process requires distillation of N,N-dimethylformamide at elevated temperatures.

Step-2: Reaction of Chloro-γ-cyclodextrin (IV) with 3-mercaptopropionic acid
(i) Usage of pyrophoric sodium hydride may pose safety issues as it forms explosive hydrogen gas.
(ii) Prolonged reaction times (12 h) at elevated temperatures (70-75° C.) may form many undesired impurities which are very difficult to eliminate from the purification process.
(iii) Condensation of chlorinated γ-cyclodextrin of formula (IV) with 3-mercaptopropionic acid requires high temperatures and prolonged hours (12-14 h). This could lead to the formation of several impurities, which are extremely difficult to eliminate by normal purification techniques and requires commercially expensive preparative HPLC technique.
(iv) Process requires partial distillation of N,N-dimethylformamide at elevated temperatures.
(v) Process requires silica gel and Sephadex G-25 column purification which is not commercially viable and time consuming.

In another patent application, U.S. Pat. No. 9,879,096 discloses a process for the preparation of Sugammadex sodium of formula (I) by chlorination of γ-cyclodextrin of formula (II) with phosphorous pentachloride in DMF to produce chloro-γ-cyclodextrin of formula (IV). Further, Chloro-γ-cyclodextrin of formula (IV) is reacted with 3-mercaptopropionic acid in the presence of sodium methoxide in methanol in DMF to give Sugammadex sodium of formula (I) present in scheme-III. The synthetic procedure is illustrated in scheme-III as below:

Scheme-III

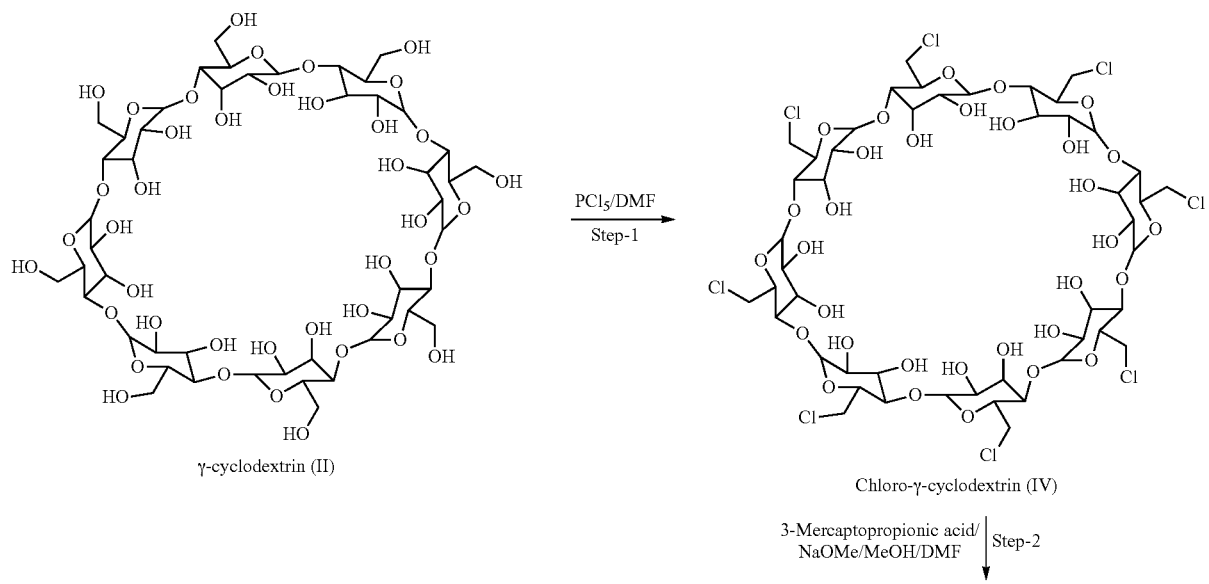

-continued

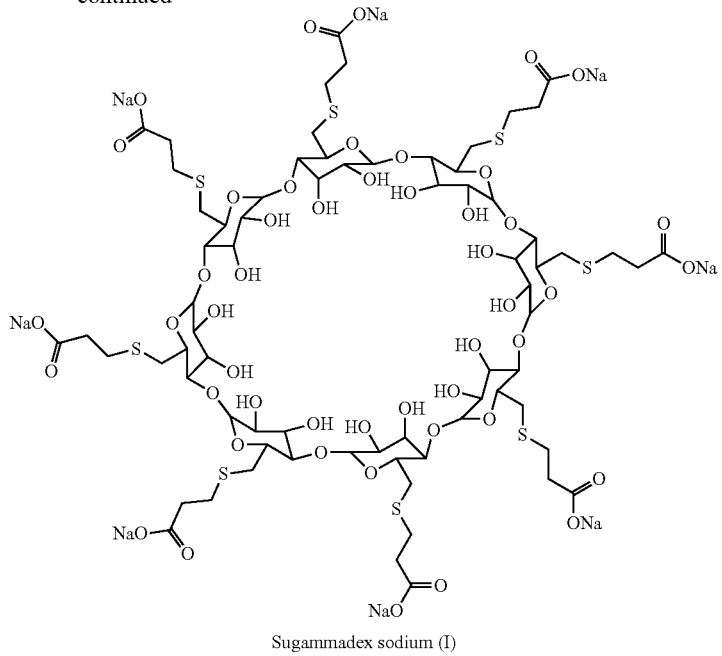

Sugammadex sodium (I)

The process disclosed in U.S. Pat. No. 9,879,096 suffers from the following disadvantages:

Step-1: Chlorination of γ-cyclodextrin
(i) Chlorination at 65-70° C. for prolonged hours (14-16h) produces lot of undesired over-chlorinate impurities, which are extremely difficult to eliminate from the desired product.
(ii) Purity/impurity profile of chlorinated γ-cyclodextrin of formula (IV) is not disclosed.

Step-2: Reaction of Chloro-γ-cyclodextrin of formula (IV) with 3-mercaptopropionic acid
(i) Condensation of chlorinated γ-cyclodextrin of formula (IV) with 3-mercaptopropionic acid requires high temperatures and prolonged hours (12-14 h). This could lead to the formation of several impurities, which are extremely difficult to eliminate by normal purification techniques and requires commercially expensive preparative HPLC technique.
(ii) Condensation of chlorinated γ-cyclodextrin of formula (IV) with 3-mercaptopropionic acid in the presence of sodium methoxide produces inferior quality of Sugammadex sodium of formula (I), which is very difficult to purify further.

WO2016/194001 A1 discloses a process for the preparation of Sugammadex sodium of formula (I) by reacting γ-cyclodextrin of formula (II) with triphosgene or oxalyl chloride in DMF to obtain chloro-γ-cyclodextrin of formula (IV), which is further reacted with 3-mercaptopropionic acid in the presence of KOH in DMF followed by treatment with aq. Hydrochloric acid to obtain Sugammadex acid of formula (Ia). It is further reacted with sodamide to obtain Sugammadex sodium of formula (I). In an alternative process, a process also disclosed for the preparation of Sugammadex sodium of formula (I) by reacting chloro-γ-cyclodextrin of formula (IV) with 3-mercaptopropionic acid in the presence of sodamide in DMF to obtain Sugammadex sodium of formula (I). The synthetic procedure is illustrated in Scheme-IV as below:

Scheme-IV

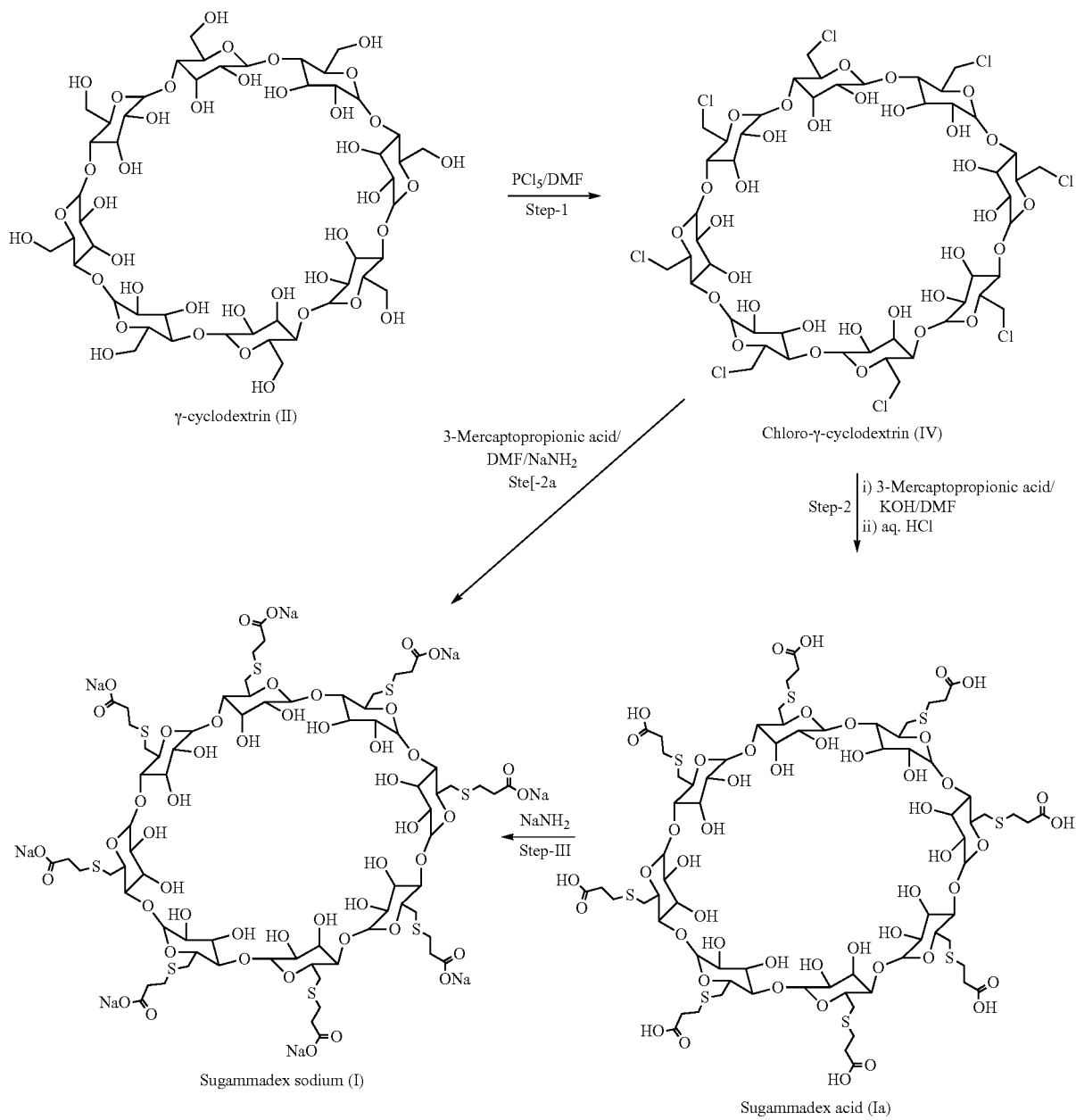

The process disclosed in WO2016/194001 suffers from the following disadvantages:

Step-1: Chlorination of γ-cyclodextrin
(i) Chlorination at 65-70° C. for prolonged hours (14-16 h) using triphosgene or oxalyl chloride in N,N-dimethylformamide produces lot of undesired over-chlorinated impurities, which are extremely difficult to eliminate from the desired product.
(ii) Highly flammable diisopropylether is required to precipitate the product from the reaction mass.
(iii) Very cumbersome work-up procedure.

Step-2: Reaction of Chloro-γ-cyclodextrin of formula (IV) with 3-mercaptopropionic acid
(i) Isolation of Sugammadex of formula (Ia) (in free acid form) is very difficult as it is highly unstable.

(ii) Isolated Sugammadex acid of formula (Ia) is having very high possibility of contamination of potassium chloride in the isolated sugammadex acid of formula (Ia) as it is isolated from ethylacetate which is very difficult to remove from the Sugammadex acid of formula (Ia).

Step-2a: Reaction of Chloro-γ-cyclodextrin of formula (IV) with 3-mercaptopropionic acid
(i) Process requires sodamide, which is dangerously reacts with water
(ii) Condensation of chlorinated γ-cyclodextrin of formula (IV) with 3-mercaptopropionic acid in the presence of sodamide produces inferior quality of Sugammadex sodium of formula (I), which is very difficult to purify further.

In another application, WO 2017/163165 A1 discloses a process for the preparation of Sugammadex sodium of formula (I) by chlorination of γ-cyclodextrin with oxalyl chloride in DMF to produce chloro-γ-cyclodextrin of formula (IV). Further chloro-γ-cyclodextrin of formula (IV) is condensed with disodium salt of 3-mercaptopropionic acid of formula (V) to obtain Sugammadex sodium of formula (I).

The synthetic procedure is illustrated in scheme-V as below:

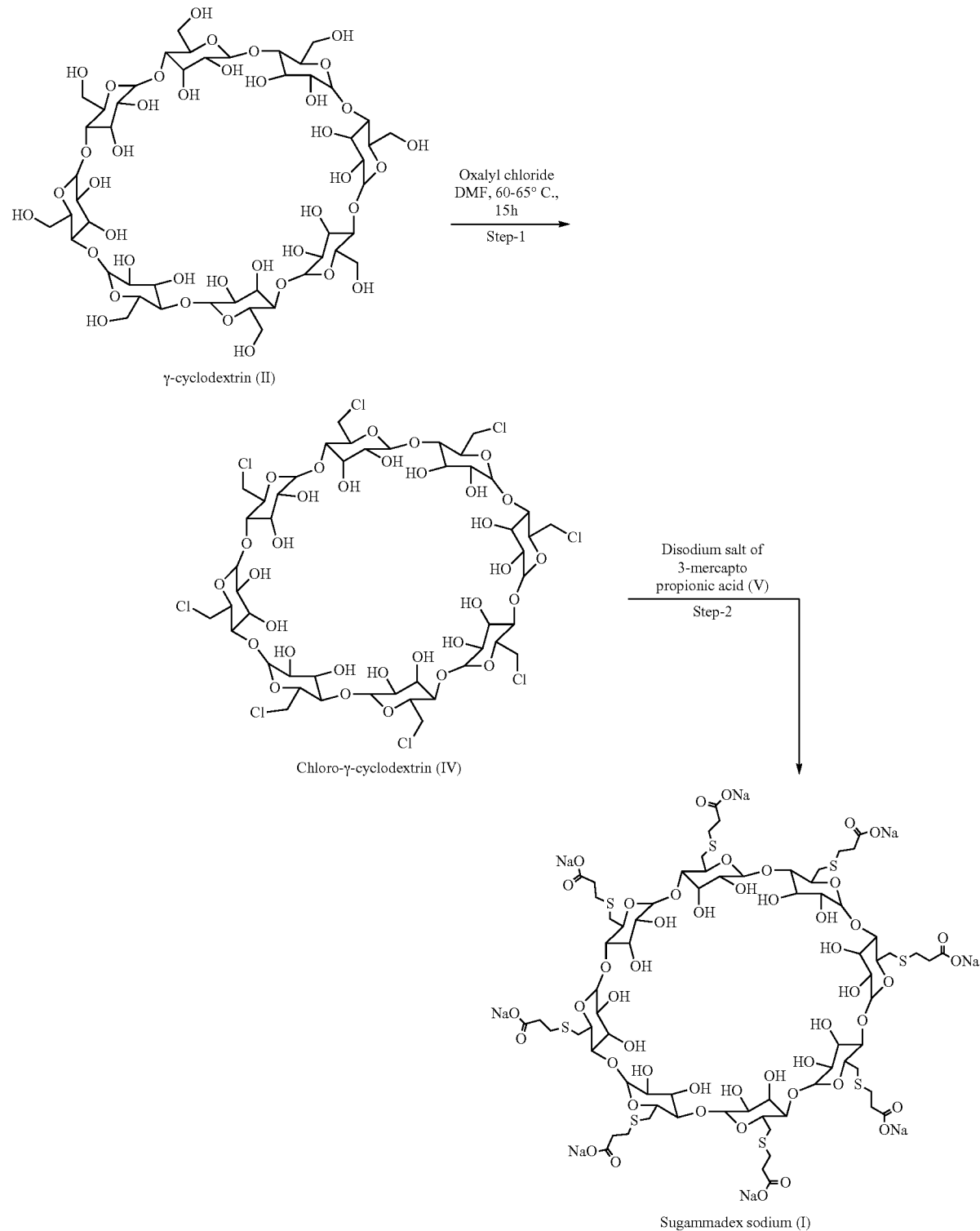

The process disclosed in WO2017/163165 suffers from the following disadvantages:

Step-1: Chlorination of γ-cyclodextrin
(i) Process requires prolonged reaction times (15 h) at elevated temperatures (60-65° C.) may form lot of undesired over-chlorinated impurities, which are extremely difficult to eliminate from the desired product.

Step-2: Reaction of chlorinated γ-cyclodextrin of formula (IV) with 3-mercaptopropionic acid disodium salt:
(i) Process requires highly moisture sensitive 3-mercaptopropionic acid disodium salt which is not commercially available.
(ii) Condensation of chlorinated γ-cyclodextrin of formula (IV) with 3-mercaptopropionic acid disodium salt requires high temperatures (70-75°) to get Sugammadex sodium of formula (I). This could lead to the formation of several impurities, which are extremely difficult to eliminate by normal purification techniques.
(iii) In our hands the isolated Sugammadex sodium of formula (I) is about 96.5% along with monohydroxy Sugammadex sodium ~1.7% and unknown impurities of about 0.2-0.36%. Having higher level of impurities in the isolated product, it is not suitable for pharmaceutical formulation.

WO 2017/144734 A1 discloses a process for the preparation of Sugammadex sodium of formula (I) by bromination of γ-cyclodextrin with Vilsmeier-Haack reagent to produce bromo-γ-cyclodextrin of formula (VI). Further condensation of bromo-γ-cyclodextrin of formula (VI) with 3-mercaptopropionic acid in the presence of Aq. NaOH in DMSO to obtain Sugammadex sodium of formula (I). The synthetic procedure is illustrated in Scheme-VI as below:

Scheme-VI

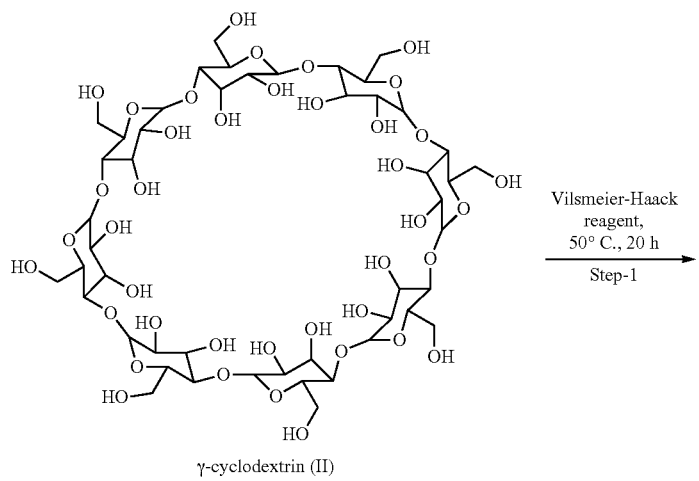

γ-cyclodextrin (II)

Vilsmeier-Haack reagent,
50° C., 20 h
Step-1

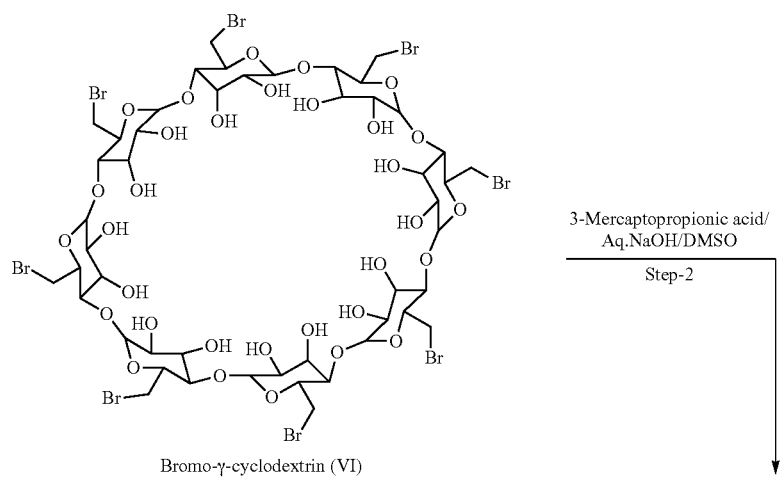

Bromo-γ-cyclodextrin (VI)

3-Mercaptopropionic acid/
Aq.NaOH/DMSO
Step-2

-continued

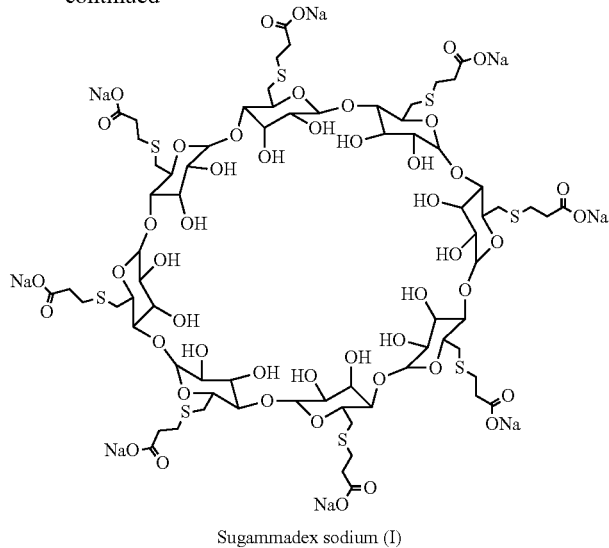

Sugammadex sodium (I)

The process disclosed in WO2017/144734 suffers from the following disadvantages:

Step-1: Vilsmeier-Haack Reagent Preparation & Isolation
(i) Isolation of highly moisture sensitive Vilsmeier-Haack reagent on commercial scale is not viable.
(ii) Bromination of γ-cyclodextrin at 50° C. for prolonged hours (20 h) produces lot of undesired over-brominated impurities, which are extremely difficult to eliminate from the desired product.
(iii) Process requires concentration of reaction mass in vacuum at elevated temperatures.
(iv) Purity/impurity profile of bromo-γ-cyclodextrin of formula (VI) is not disclosed.

Step-2: Reaction of Bromo-γ-cyclodextrin of formula (VI) with 3-mercaptopropionic acid
(i) Purity of Sugammadex sodium reported to be <90.0%.
(ii) In our hands, when Aq. NaOH is used, mono & di-Bromo impurities of corresponding Sugammadex sodium are observed.
(iii) Impurity profile of Sugammadex Sodium not disclosed.
(iv) Prolonged drying (6 days) of Sugammadex sodium of formula (I) at 60° C., not a suitable drying operation on commercial scale.
(v) In our hands the isolated Sugammadex sodium of formula (I) is about 93.7% along with monohydroxy Sugammadex sodium ~2.85% and couple of unknown impurities of about 0.8-1.1%. Having these higher level of impurities in the isolated product, it is not suitable for pharmaceutical formulation.

Further, it is observed from the HPLC analysis results of marketed sample of Sugammadex sodium (Bridion Inj.) that, four unknown impurities are detected and are in the range of 0.15 to 0.36% along with known impurities like Sugammadex sodium sulfoxide impurities about 0.40 to 0.59% and monohydroxy Sugammadex sodium about 1.4-1.6%. The purity of Sugammadex sodium of formula (I) is found to be about 95.5% by HPLC.

However, in spite of having the choice of variety of methods for the preparation of Sugammadex sodium of formula (I), there is still need to have a simple, cost effective and commercially viable process for the preparation of Sugammadex sodium of formula (I) on large scale operations, since, in general, the following common disadvantages are associated with the existing processes for the preparation of Sugammadex sodium of formula (I).

Halogenation of γ-cyclodextrin of formula (II):
a) The processes cited above, require highly expensive iodine or highly moisture sensitive chlorinating agents like PCl$_5$ or oxalyl chloride etc.,
b) Halogenation done at elevated temperatures for prolonged hour's.
c) Isolation and usage of highly moisture sensitive Vilsmeier-Haack reagent.
d) Distillation of high boiling solvents at elevated temperatures leads to formation of unknown impurities.
e) Very cumbersome and tedious work-up procedures Condensation of halogenated γ-cyclodextrin with 3-mercaptopropionic acid
a) Isolation of highly moisture sensitive 3-mercaptopropionic acid disodium salt.
b) Usage of highly pyrophoric sodium hydride or highly water reactive sodamide as base
c) Condensation of halogenated γ-cyclodextrin with 3-mercaptopropionic acid done at elevated temperatures for prolonged hour's
d) Distillation of high boiling solvent at elevated temperatures leads to formation of unknown impurities
e) Expensive purification techniques like membrane dialysis, lyophilisation, preparative HPLC or chromatographic purification using expensive Sephadex column.
f) Prolonged drying operations Hence there is an urgent need for a simple, cost effective and commercially viable process for the preparation of Sugammadex sodium of formula (I) on large scale to meet the market demand. Accordingly, the process should be circumventing the following disadvantages like:

In Step-1: Halogenation of γ-cyclodextrin
(i) Avoiding usage of expensive iodine for iodination of γ-cyclodextrin.
(ii) Avoiding usage of chlorinated reagents like PCl$_5$, oxalyl chloride etc., for chlorination of γ-cyclodextrin.
(iii) Avoiding prolonged reaction times at elevated temperatures there by effectively controlling over-halogenated impurities.
(iv) Effective usage of analytical techniques like HPLC to monitor quality of the brominated γ-cyclodextrin of formula (VI).

(v) Avoiding distillation of dimethylformamide in the process there by controlling impurities resulting from distillation under high temperatures.
(vi) Avoiding tedious work-up procedures.
(vii) Avoiding isolation of highly moisture sensitive Vilsmeier-Haack reagent in the process.

In Step-2: Condensation of halogenated-γ-cyclodextrin with 3-mercaptopropionic acid
(i) Avoiding usage of highly moisture sensitive 3-mercaptopropionic acid disodium salt.
(ii) Avoiding highly pyrophoric sodium hydride or sodamide, which are highly reactive towards water on commercial scale.
(iii) Avoiding prolonged reaction times at elevated temperatures thereby controlling process related impurities.
(iv) Avoiding distillation of high boiling point solvent such as N,N-dimethylformamide at elevated temperatures for prolonged hours.
(v) Avoiding commercially expensive purification techniques like membrane dialysis, lyophilisation, preparative HPLC or chromatographic purification using Sephadex column thereby reducing large volumes of solvents, time & energy consumption and improve the output.
(vi) Effective usage analytical techniques like HPLC to monitor quality of the Sugammadex sodium of formula (I).
(vii) Avoiding prolonged drying operations.

WO 2018185784 also discloses a purification step of Sugammadex sodium from methanol, water or DMF and reveals PXRD pattern of Sugammadex.

U.S. Pat. No. 10,336,835 discloses a Form-I, Form-II and Form-III of Sugammadex and preparations thereof.

OBJECTIVE OF THE INVENTION

Keeping in view of the above disadvantages associated with the processes disclosed in the literature for the preparation of Sugammadex sodium of formula (I), the inventors of the present invention have developed a simple, economical and commercially viable process for commercial production of Sugammadex sodium of formula (I) by circumventing the above mentioned disadvantages. Accordingly, the main objective of the present invention is to provide an improved process for the preparation of Sugammadex sodium of formula (I), which comprises simple, safe, economical and commercially viable process which surpasses the above mentioned disadvantages.

SUMMARY OF THE INVENTION

An improved process for the preparation of Sugammadex sodium of formula (I) comprising the steps of:

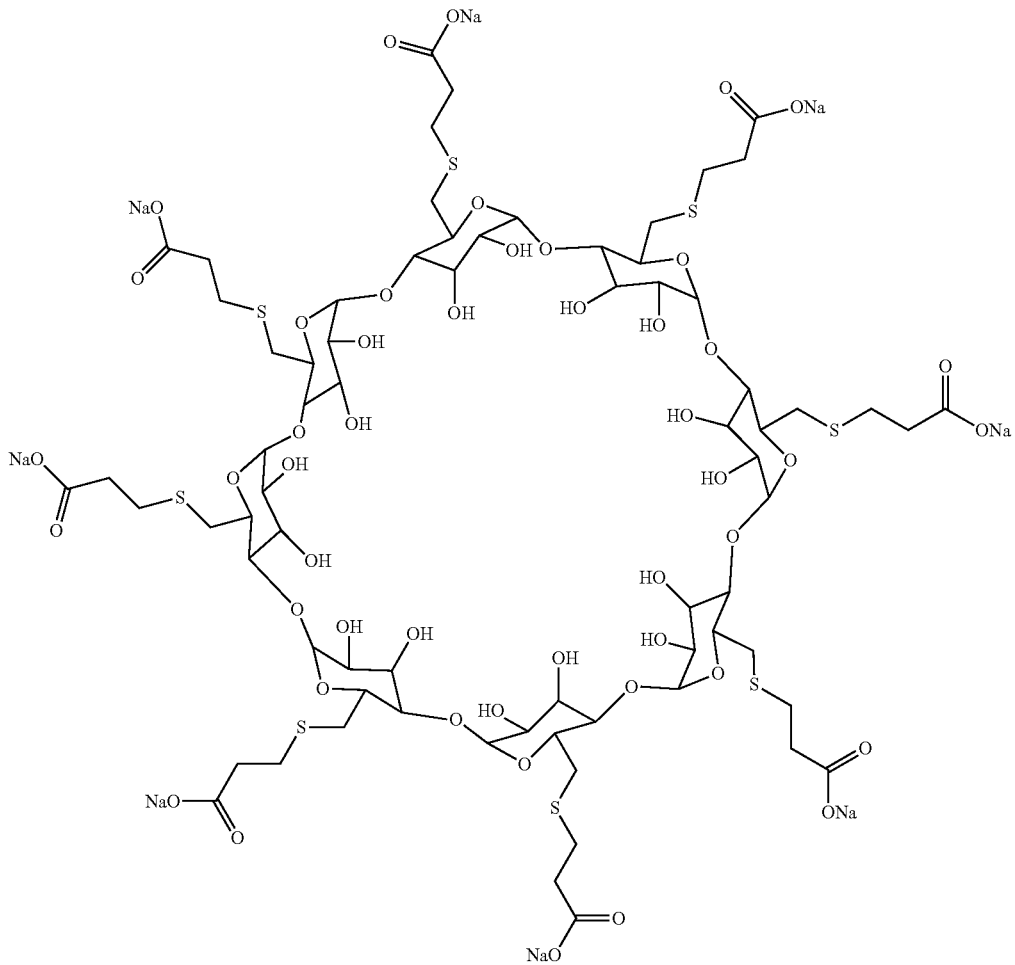

Formula I (i) de-hydration of γ-cyclodextrin of formula (II) under azeotropic conditions in an organic solvent Formula II

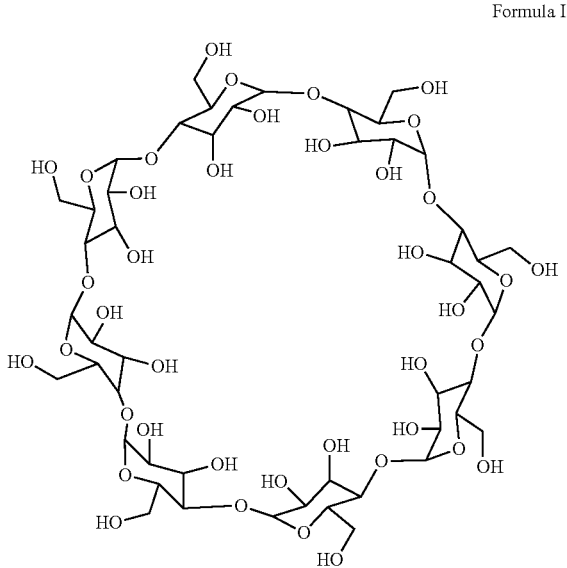

(ii) brominating primary hydroxyl groups of freshly de-hydrated γ-cyclodextrin of formula (II) as obtained in step (i) with in-situly generated bromine-DMF-TPP complex (Vilsmeier Haack reagent) in a polar organic solvent to obtain bromo γ-cyclodextrin of formula (VI).

Formula VI

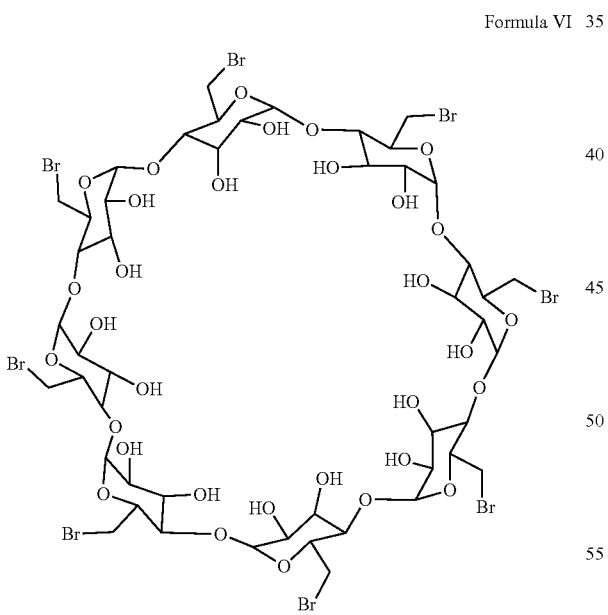

(iii) optionally purifying bromo γ-cyclodextrin of formula (VI) from a suitable solvent.

(iv) reacting bromo γ-cyclodextrin of formula (VI), with 3-mercaptopropionic acid in the presence of sodium base in an organic solvent to produce Sugammadex sodium of formula (I).

(vi) optionally purifying Sugammadex sodium of formula (I) from suitable solvent.

wherein the obtained Sugammadex sodium of formula (I) have
a) more than 98.5% of Purity
b) less than 1.0% of monohydroxy Sugammadex sodium and
c) less than 0.15% of any other known or unknown impurities by HPLC In one aspect, the present invention provides a crystalline form of Sugammadex sodium, designated as Form-N.

In another aspect, the present invention provides process for preparation of Sugammadex sodium Form-N.

In another aspect, the present invention provides pharmaceutical compositions comprising the crystalline Form-N of Sugammadex sodium and a pharmaceutically acceptable carrier.

In another aspect, the present invention provides a method of using crystalline Form-N of Sugammadex sodium in the manufacture of a medicament for reversal of neuromuscular blockade by the agent rocuronium or vecuronium in general anaesthesia.

DETAILED DESCRIPTION OF THE INVENTION

Figure 1:
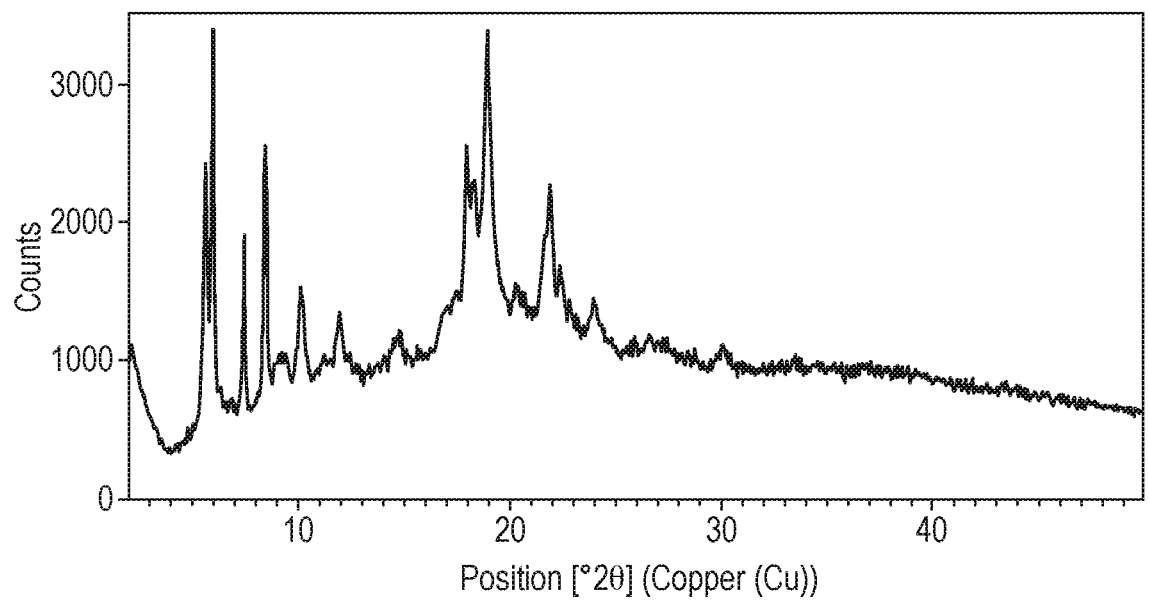
FIG. 1 shows a representative X-ray powder diffraction (XRPD) pattern of crystalline Form-N of Sugammadex sodium.

In an embodiment of the present invention provides, an improved process for the preparation of Sugammadex sodium of formula (I) comprising the steps of:
(i) de-hydration of γ-cyclodextrin of formula (II) under azeotropic conditions in an organic solvent,
(ii) brominating primary hydroxyl groups of freshly de-hydrated γ-cyclodextrin of formula (II) as obtained in step (i) with in situ generated bromine-DMF-TPP complex (Vilsmeier Haack reagent) in a polar organic solvent to obtain bromo γ-cyclodextrin of formula (VI),
(iii) optionally purifying bromo γ-cyclodextrin of formula (VI) from a suitable solvent,
(iv) reacting bromo γ-cyclodextrin of formula (VI), with 3-mercaptopropionic acid in the presence of sodium base in an organic solvent to produce Sugammadex sodium of formula (I),
(v) optionally purifying Sugammadex sodium of formula (I) from suitable solvent.
wherein the obtained Sugammadex sodium of formula (I) have
(a) more than 98.5% of Purity
(b) less than 1.0% of monohydroxy Sugammadex sodium and
(c) less than 0.15% of any other known or unknown impurities by HPLC.

In step (i) of the present invention, freshly de-hydrated γ-cyclodextrin of formula (II) is prepared by de-hydrating commercially available γ-cyclodextrin of formula (II) under azeotropic conditions at 65-90° C. preferably 75-85° C. in an organic solvent.

In step (i) of the present invention, the organic solvent is selected from toluene or cyclohexane preferably cyclohexane.

In step (i) of the present invention, after de-hydration, the freshly de-hydrated γ-cyclodextrin of formula (II) is directly utilized in step (ii) without isolation.

In step (ii) of the present invention, the polar organic solvent is selected from N,N-Dimethylformamide, N,N-dimethylacetamide, N-formylpiperidine, N-formylmorpholine, N-methylpyrrolidone or N-methylformanilide etc., preferably N,N-dimethylformamide.

In step (ii) of the present invention, the Vilsmeier-Haack reagent can be formed for instance using $PPh_3$, $Br_2$ and DMF.

In step (ii) of the present invention, the temperature at which bromine is added to cooled solution of N,N-dimethylformamide-triphenylphosphine is between −5 to 30° C. preferably 0-15° C.

In step (ii) of the present invention, after addition of bromine, the temperature at which, the complex mixture is maintained is between 25-45° C. preferably 20-30° C. for about 2-4 h.

In step-(ii) of the present invention, bromo-γ-cyclodextrin of formula (VI) is prepared by reacting freshly de-hydrated γ-cyclodextrin of formula (II) with Vilsmeier-Haack reagent in a N,N-dimethylformamide.

In step (ii) of the present invention, the temperature at which freshly de-hydrated γ-cyclodextrin of formula (II) is reacted and maintained with above Vilsmeier-Haack reagent is between 50-90° C. preferably 75-80° C. for about 5-7 h preferably 5-6 h.

In step (ii) of the present invention, after completion of reaction, the temperature at which the reaction mixture is quenched with ~25% sodium methoxide in methanol solution is between 0-20° C. preferably 5-15° C.

In step (ii) of the present invention, bromo-γ-cyclodextrin of formula (VI) is precipitated by the addition of polar organic solvent or mixture.

In step (ii) of the present invention, the polar organic solvent is selected from methanol, ethanol, acetone, acetonitrile, isopropyl alcohol and water preferably mixture thereof.

In step (iii) of the present invention, bromo-γ-cyclodextrin of formula (VI) is optionally purified from organic solvent selected methanol, ethanol, n-propanol, isopropanol, n-butanol, isobutylalcohol, tert-butylalcohol, isoamylalcohol, 2-methoxyethanol, acetone, ethyl methyl ketone, methylisobutylketone, 2-pentanone, diethylketone; dimethylformamide, dimethyl sulfoxide, acetonitrile, dichloromethane, or mixture thereof.

In step (iii) of the present invention, the purification may be performed usually from 0° C. to 80° C. for 30 min to 10 hours, preferably 20-70° C.

In step (iii) of the present invention, the HPLC purity of bromo-γ-cyclodextrin of formula (VI) obtained after purification process is >94.0%.

In step (iv) of the present invention, bromo-γ-cyclodextrin of formula (VI) is condensed with 3-mercaptopropionic acid in the presence of sodium base in an organic solvent.

In step (iv) of the present invention, commercially available 3-mercaptopropionic acid is optionally purified by fractional distillation under vacuum.

In step (iv) of the present invention, the organic solvent used for condensation of bromo-γ-cyclodextrin of formula (VI) with 3-mercaptopropionic acid in the presence of sodium base is selected from N,N-dimethylformamide, dimethyl sulfoxide, or mixture thereof preferably dimethyl sulfoxide.

In step (iv) of the present invention, sodium base used for the condensation of bromo-γ-cyclodextrin of formula (VI) with 3-mercaptopropionic acid is selected from sodium hydroxide powder or sodium hydroxide flakes or sodium hydroxide pellets preferably sodium hydroxide powder.

In step (iv) of the present invention, the temperature at which bromo-γ-cyclodextrin of formula (VI) is dissolved in dimethyl sulfoxide is selected from 10-45° C. preferably 25-30° C. under inert atmosphere.

In step (iv) of the present invention, the mole equivalents of sodium base used in between 20 to 40, preferably 32 to 36 mole equivalents with respective bromo-γ-cyclodextrin of formula (VI).

In step (iv) of the present invention, the temperature at which dissolution of sodium hydroxide powder in dimethyl sulfoxide takes place between 15-50° C. preferably 25-30° C. under inert atmosphere.

In step (iv) of the present invention, the mole equivalents of 3-mercaptopropionic acid are in between 10 to 20, preferably 12 to 20 mole equivalents and most preferably 16 to 18 mole equivalents with respective to bromo-γ-cyclodextrin of formula (VI).

In step (iv) of the present invention, 3-mercaptopropionic acid is added to the above sodium hydroxide powder in DMSO solution under inert atmosphere.

In step (iv) of the present invention, water is optionally added to the above solution (sodium base, 3-mercaptopropionic acid and dimethyl sulfoxide) under inert atmosphere.

In the step (iv) of the present invention, to the above 3-mercaptopropionic acid solution, is added above dissolved solution of bromo-γ-cyclodextrin of formula (VI) in dimethyl sulfoxide in about 15-300 min. preferably 60-180 min under inert atmosphere.

In step (iv) of the present invention, the temperature at which, the addition of bromo-γ-cyclodextrin solution of formula (VI) to the above 3-mercaptopropionic acid solution is selected from 10-65° C. preferably 25-30° C. under inert atmosphere.

In step (iv) of the present invention, the time of reaction is preferably 15-300 min. preferably 60-120 min under inert atmosphere.

In step (iv) of the present invention, after completion of reaction, Sugammadex sodium is precipitated by addition of water, water miscible organic solvent or both. In step (iv) of the present invention, the water miscible organic solvent is selected from N,N-dimethylformamide, dimethyl sulfoxide, methanol, ethanol, acetone, acetonitrile, tetrahydrofuran, isopropyl alcohol etc., preferably dimethyl sulfoxide.

In step (v) of the present invention, the solvent used in the purification of Sugammadex sodium of formula (I) is selected from water, dimethyl sulfoxide, methanol, ethanol, isopropyl alcohol, acetone, acetonitrile, tetrahydrofuran or mixtures thereof.

In step (v) of the present invention, Sugammadex sodium of formula (I) obtained from the above is having more than 98.5% HPLC purity along with less than 1.0% monohydroxy Sugammadex sodium and less than 0.15% any other known or unknown impurities by HPLC.

The following impurities are identified in the above process of present invention.

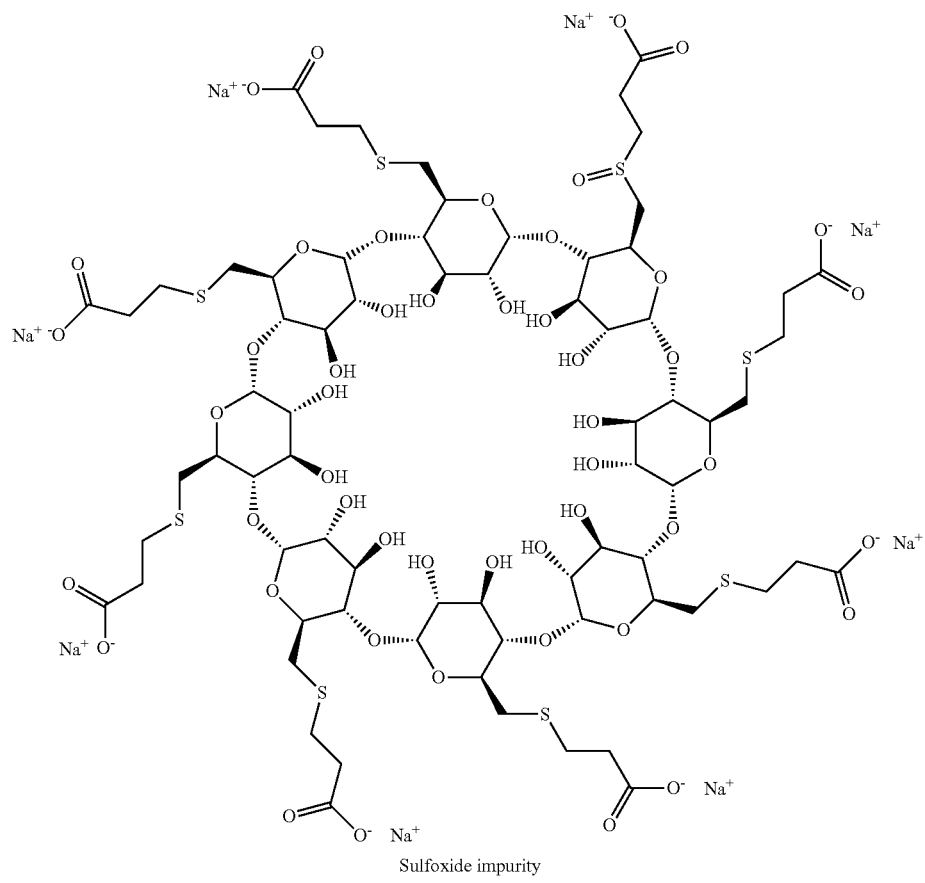
Sulfoxide impurity
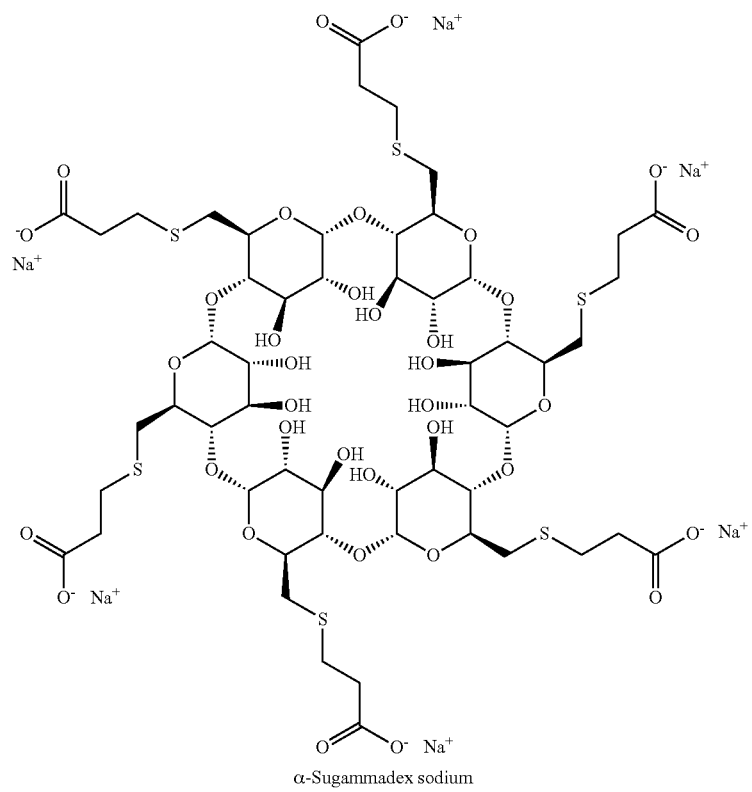
α-Sugammadex sodium

-continued
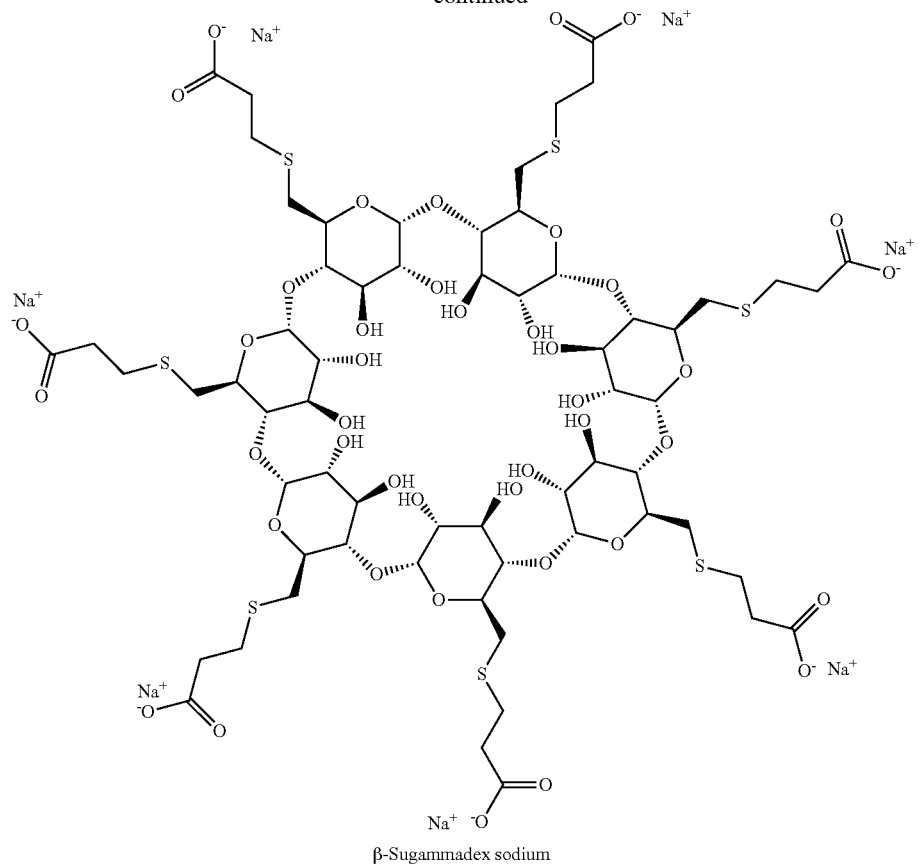
β-Sugammadex sodium
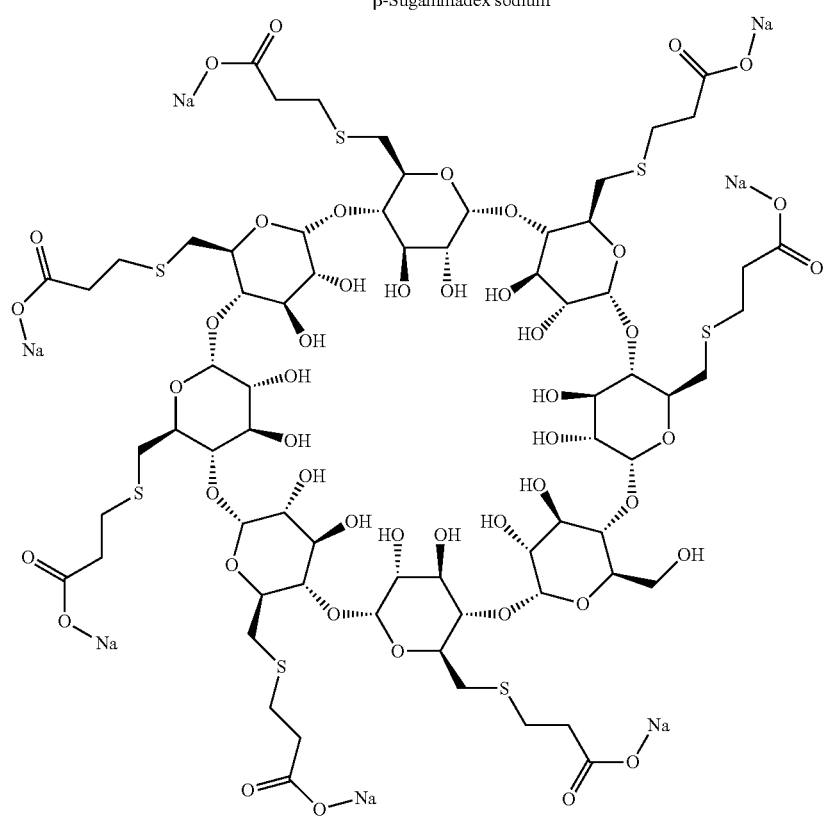
Monohydroxy Sugammadex sodium Another embodiment of present invention provides a crystalline form of Sugammadex sodium, designated as Form-N.

The crystalline Form-N is characterized by an X-ray powder diffraction pattern comprising the following 2θ values measured using CuKα radiation: 5.6, 10.1, 11.9 and 21.9±0.2°.

In another embodiment of the present invention, the crystalline Form-N is characterized by an X-ray powder diffraction pattern further comprising the following 2θ values measured using CuKα radiation: 5.9, 7.4, 8.4, 17.9 and 18.9±0.2°.

The crystalline Form-N has an X-ray powder diffraction pattern substantially as shown in FIG. 1.

Figure 2:
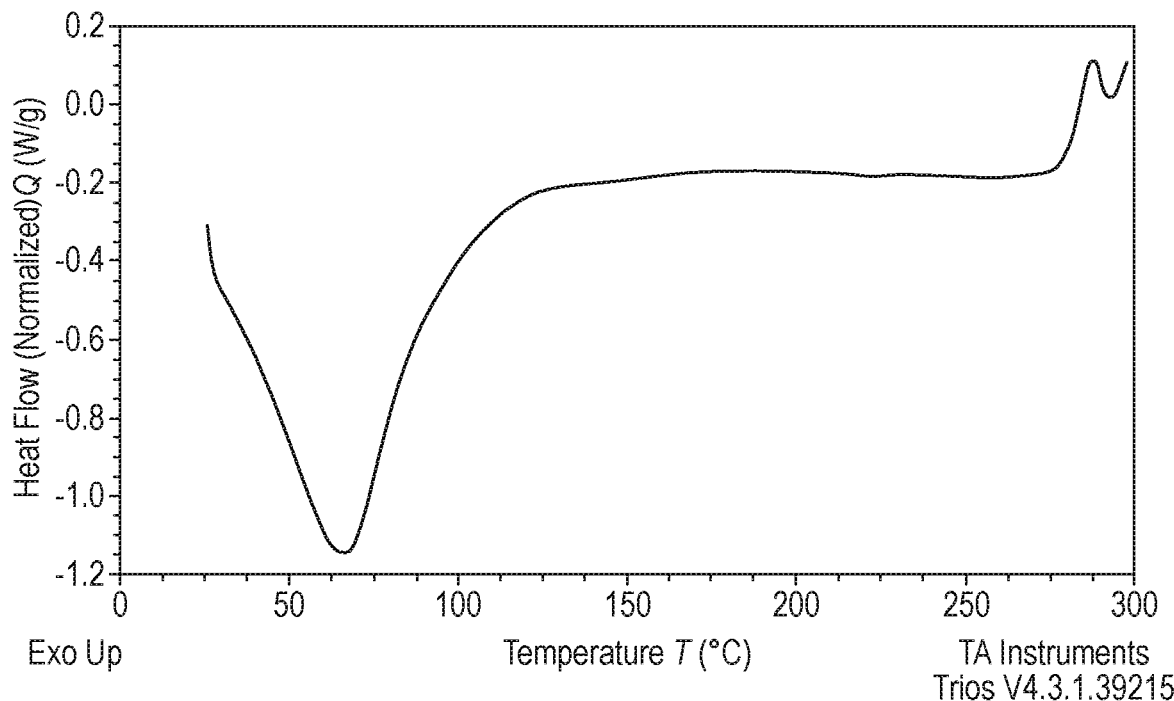
FIG. 2 shows a representative differential scanning calorimetry (DSC) thermogram of crystalline Form-N of Sugammadex sodium.

The crystalline Form-N has a differential scanning calorimetry thermogram substantially as shown in FIG. 2, which exhibits a very broad endothermic peak at followed by melt with decomposition above 270° C.

Figure 3:
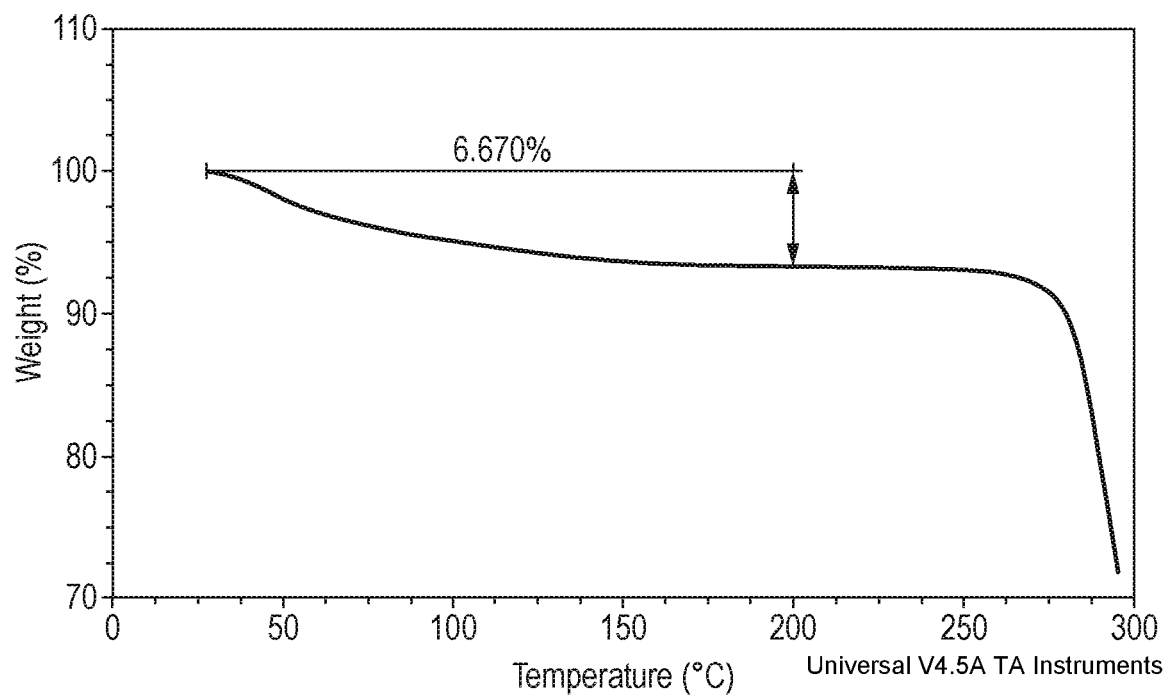
FIG. 3 shows a representative thermal gravimetric analysis (TGA) thermogram of crystalline Form-N of Sugammadex sodium.

The crystalline Form-N has a thermogravimetric analysis thermogram substantially as shown in FIG. 3.

Another aspect of the present invention, provides a process for the preparation of crystalline Form-N of Sugammadex sodium, which comprises of:

a) Precipitating Sugammadex sodium from aqueous solution using ethanol, b) filtering precipitated Sugammadex sodium obtained in step (a), c) drying the wet Sugammadex sodium obtained in step (b) at temperature ranging from 20° C. to 100° C. to obtain crystalline Form-N of Sugammadex sodium.

X-Ray Powder Diffraction (XRPD)

Analytical Instrument: PANalytical Empyrean. The Powder X-ray Diffractograms were obtained by PANalytical, Empyrean diffractometer. The 2θ position was calibrated against PANalytical 640 Si powder standard. The sample irradiated with X-rays generated by a copper long-fine focus tube operated at 45 kV and 40 mA with a wavelength of Kα1=1.540589 angstroms and Kα2=1.544426 angstroms (Kα1/Kα2 intensity ratio is 0.50). The collimated X-ray source was passed through a programmed divergence slit of irradiated length of 10 mm and the reflected radiation directed through an 8.0 mm anti-scatter slit. The Kβ radiations was filtered by nickel filter. The sample was exposed for 93.84 seconds per 0.026° 2-theta increment (continuous scan mode) over the range 3 degrees to 50 degrees 2-theta in theta-theta geometry. The running time was 12 minutes and 38 seconds. The instrument was equipped with a PIXcel 1D detector. The data was collected by using PANalytical data collector software.

Persons skilled in the art of X-ray powder diffraction will realize that the relative intensity and the position of reflections that can be affected by the precise height at which the sample placed on the goniometer. The sample was prepared by back loading technique which minimize the particle statistics of the particles having needle and plate like morphologies.

Differential Scanning Calorimetry (DSC)

The thermal profiles were recorded on TA Instruments, DSC2500, discovery series. Approximately ~4.0 mg of the sample was weighed into Tzero aluminum hermetic pans of 40 μL and sealed with alumina lid using crimper. The sample was heated from RT to 250° C., with a rate of 10° C./min in $N_2$ environment with a purge rate of 50 mL/min. An Iridium standard was used to check the temperature and enthalpy.

Thermal Gravimetric Analysis (TGA)

The thermal profiles were recorded on TA Instruments, Q500 TGA. Approximately ~4.0 mg of the sample was taken in a dried platinum sample pan. The sample was heated from RT to 300° C., with a rate of 10° C./min in $N_2$ environment with a sample purge rate of 60 mL/min and Balance purge rate of 40 mL/min. Nickel and Alumel standards were used to calibrate the temperature by the determination of Curie point of respective standards.

Advantages (i) The process of the present invention does not require highly expensive iodine or highly moisture sensitive chlorinating agents.

(ii) No prolonged reaction times at elevated temperatures are required for bromination reaction of γ-cyclodextrin of formula (II)/condensation of bromo-γ-cyclodextrin of formula (VI) with 3-mercaptopropionic acid thereby controlling the formation of over-brominated γ-cyclodextrin/related impurities.

(iii) Isolation of highly moisture sensitive Vilsmeier-Haack reagent is not needed.

(iv) No distillation of high boiling solvent at elevated temperatures.

(v) Present process circumvents cumbersome and tedious work-up procedures.

(vi) Isolation of highly moisture sensitive 3-mercaptopropionic acid disodium salt is not needed.

(vii) Present process successfully avoided highly pyrophoric bases like sodium hydride or highly water reactive bases like sodamide.

(viii) Present process does not require expensive purification techniques like membrane dialysis, lyophilisation, preparative HPLC or chromatographic purification thereby reducing large volumes of solvents, time & energy consumption and improve the output.

(ix) Present process uses commercially available sodium hydroxide powder as sodium base.

(x) Present process produces Sugammadex sodium of formula (I) with >98.5% HPLC purity along with less than 1% monohydroxy Sugammadex sodium and less than 0.15% any other known or unknown impurities by HPLC.

(xi) Present process produces thermally stable polymorph, Form-N of Sugammadex sodium.

The following examples are provided to illustrate the invention and are merely for illustrative purpose only and should not be construed to limit the scope of the invention.

EXAMPLES

Example-1: Preparation of Octakis (6-deoxy-6-bromo)gamma cyclodextrin

Triphenylphosphine (505.3 g) was dissolved to N,N-Dimethylformamide (1610 mL) and cooled to 0-5° C. Bromine (315.3 g) was added to the reaction mass and stirred at ambient temperature for 2 h. Freshly de-hydrated γ-cyclodextrin (111 g) was suspended in N,N-Dimethylformaimide and the suspension was added to the reaction mass at ambient temperature and heated at ~80° C. for 6 h. The reaction mixture was cooled to room temperature and basified with 25% sodium methoxide solution. Methanol followed by water were added to the reaction mass and stirred for 30 min and filtered the product. The wet product was successively purified in methanol, DMF-Acetonitrile, DMF-Acetone and acetone. The wet product was dried at 65° C. Yield: 108.1 g. HPLC purity: >97%.

Example-2: Preparation of Octakis (6-deoxy-6-bromo)gamma cyclodextrin

Triphenylphosphine (136.8 Kg) was dissolved to N,N-Dimethylformamide (546 L) and cooled to 0-5° C. Bromine (85.2 Kg) was added to the reaction mass and stirred at ambient temperature for 2 h. Freshly de-hydrated γ-cyclodextrin (30 Kg) was suspended in N,N-Dimethylformaimide and the suspension was added to the reaction mass at ambient temperature and heated at ~80° C. for 6 h. The reaction mixture was cooled to room temperature and basified with 25% sodium methoxide solution. Methanol followed by water were added to the reaction mass and stirred for 30 min and filtered the product. The wet product was successively purified in methanol, DMF-Acetonitrile, DMF-Acetone and acetone. The wet product was dried at 65° C. Yield: 28.5 Kg. HPLC purity: >97%.

Example-3: Preparation of $6^A,6^B,6^C,6^D,6^E,6^F,6^G,6^H$-octakis-S-(2-carboxyethyl)-$6^A,6^B,6^C,6^D,6^E,6^F,6^G,6^H$-octathio-γ-cyclodextrin octasodium salt (Sugammadex Sodium) (I)

Sodium hydroxide powder (63.1 g) was added to the solution of 3-Mercaptopropionic acid (84.8 g) in dimethylsulfoxide (1.6 Lt) and stirred at ambient temperature for dissolution. Water (58 mL) followed by solution of bromo γ-cyclodextrin (80 g) in dimethylsulfoxide (240 mL) were added to the reaction mass at 25-30° C. and stirred for 1 h. Thereafter, water followed by dimethylsulfoxide were added to the reaction mass and filtered the solid mass. The wet solid mass was treated with activated carbon, filtered and the filtrate was precipitated with dimethylsulfoxide. The resulting Sugammadex sodium wet product was purified from aqueous methanol. The resulting wet product was dried at 80° C. Yield: 67.7 g; HPLC purity of Sugammadex: 99.0% & Monohydroxy Sugammadex: about 0.35%.

Example-4: Preparation of $6^A,6^B,6^C,6^D,6^E,6^F,6^G,6^H$-octakis-S-(2-carboxyethyl)-$6^A,6^B,6^C,6^D,6^E,6^F,6^G,6^H$-octathio-γ-cyclodextrin octasodium salt (Sugammadex Sodium) (I)

Sodium hydroxide powder (15.76 g) was added to the solution of 3-Mercaptopropionic acid (21.2 g) in dimethyl sulfoxide (400 mL) and stirred at ambient temperature for dissolution. The solution of bromo γ-cyclodextrin (20 g) in dimethyl sulfoxide (80 mL) is added to the reaction mass at 25-30° C. and stirred for 1 h at the same temperature. Thereafter, water followed by dimethyl sulfoxide were added to the reaction mass and filtered the solid mass. The wet solid mass was treated with activated carbon, filtered and the filtrate was precipitated with dimethylsulfoxide. The resulting Sugammadex sodium wet product was purified from aqueous methanol. The resulting wet product was dried at 80° C. Yield: 16.0 g; HPLC purity of Sugammadex: >99.32% & Monohydroxy Sugammadex: about 0.18%.

Example-5: Preparation of $6^A,6^B,6^C,6^D,6^E,6^F,6^G,6^H$-octakis-S-(2-carboxyethyl)-$6^A,6^B,6^C,6^D,6^E,6^F,6^G,6^H$-octathio-γ-cyclodextrin octasodium salt (Sugammadex Sodium) (I) (Form-N)

Sodium hydroxide powder (2.76 Kg) was added to the solution of 3-Mercaptopropionic acid (3.71 Kg) in dimethylsulfoxide (70 L) and stirred at ambient temperature for dissolution. Water (2.53 L) followed by solution of bromo γ-cyclodextrin (3.5 Kg) in dimethylsulfoxide (14 L) were added to the reaction mass at 25-30° C. and stirred for ~1 h. Thereafter, water followed by dimethylsulfoxide were added to the reaction mass and filtered the solid mass. The wet solid mass was treated with activated carbon, filtered and the filtrate was precipitated with dimethylsulfoxide. The resulting Sugammadex sodium wet product was successively purified from aqueous methanol and aqueous ethanol. The resulting wet product was dried at ~80° C. Yield: 2.7 Kg; HPLC purity of Sugammadex: 99.0% & Monohydroxy Sugammadex: 0.43% and maximum single known impurity: 0.09%

P-XRD 2θ Values of Sugammadex Sodium (Form-N) Obtained From Example 5

TABLE 1

| 2-theta | d spacing | intensity % |
|---|---|---|
| 5.61 | 15.74 | 65.53 |
| 5.97 | 14.79 | 100.0 |
| 7.45 | 11.85 | 45.0 |
| 8.44 | 10.46 | 64.82 |
| 10.12 | 8.73 | 25.77 |
| 11.91 | 7.42 | 17.54 |
| 17.92 | 4.94 | 49.26 |
| 18.96 | 4.67 | 76.64 |
| 21.90 | 4.05 | 39.97 |

We claim:
1. An improved process for the preparation of Sugammadex sodium of formula (I), comprising the steps of:
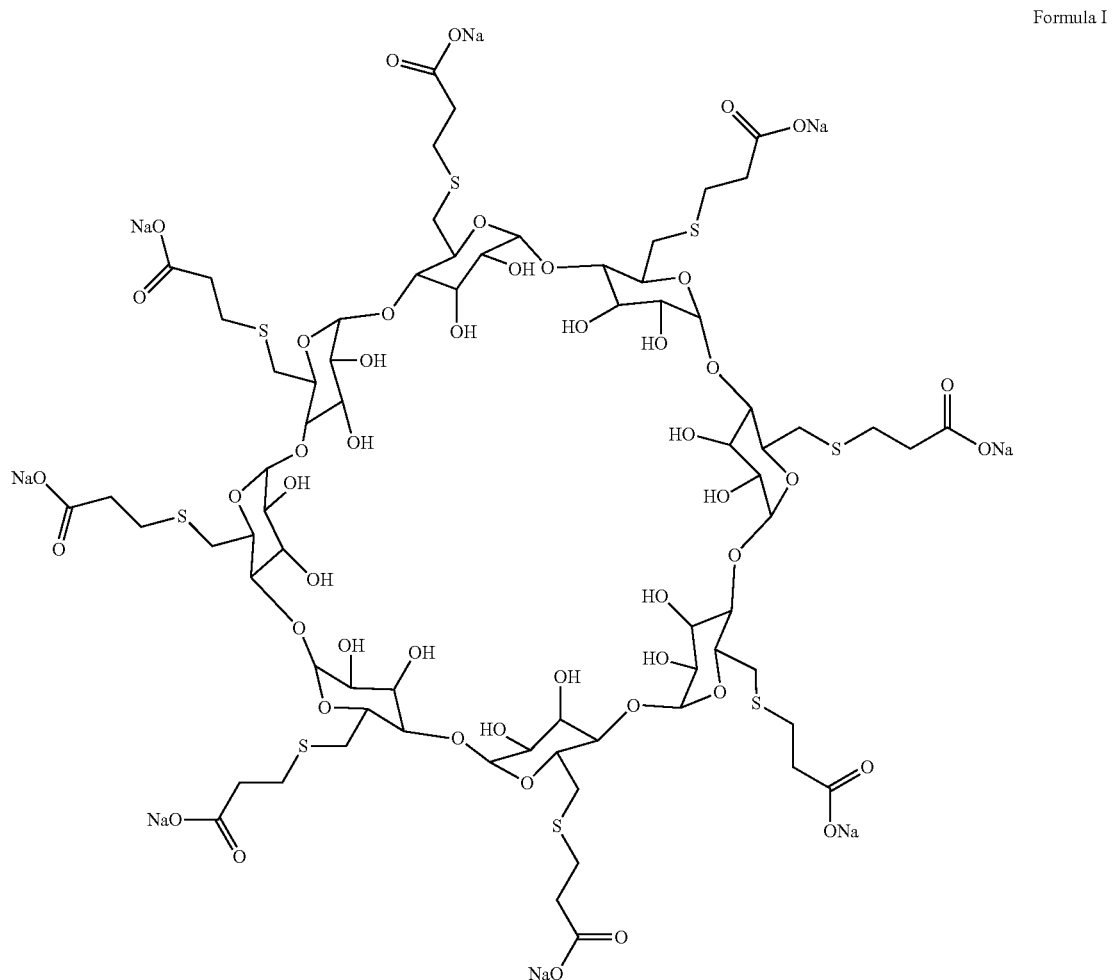
Formula I

(i) de-hydration of γ-cyclodextrin of formula (II) under azeotropic conditions in an organic solvent, Formula II (ii) brominating primary hydroxyl groups of freshly de-hydrated γ-cyclodextrin of formula (II) as obtained in step (i) with in situ generated bromine-DMF-triphenylphosphine complex (Vilsmeier Haack reagent) in a polar organic solvent to obtain bromo γ-cyclodextrin of formula (VI), Formula VI (iii) optionally purifying bromo γ-cyclodextrin of formula (VI) from a suitable solvent,
(iv) reacting bromo γ-cyclodextrin of formula (VI), with 3-mercaptopropionic acid in the presence of sodium base in an organic solvent to produce Sugammadex sodium of formula (I), wherein the sodium base is selected from sodium hydroxide powder or sodium hydroxide flakes or sodium hydroxide pellets, (v) optionally purifying Sugammadex sodium of formula (I) from suitable solvent wherein the obtained Sugammadex sodium of formula (I) have
   a) more than 98.5% of HPLC purity
   b) less than 1.0% of monohydroxy Sugammadex sodium and
   c) less than 0.15% of any other known or unknown impurities by HPLC.

2. The process as claimed in claim 1, wherein the organic solvent used in step-(i) is selected from toluene, cyclohexane or mixture thereof.

3. The process as claimed in claim 1, wherein the polar organic solvent used in step-(ii) is selected from N,N-Dimethylformamide, N,N-dimethylacetamide, N-formylpiperidine, N-formylmorpholine, N-methylpyrrolidone, N-methylformanilide or mixture thereof.

4. The process as claimed in claim 1, wherein the organic solvent used in step-(iii) is selected from methanol, ethanol, n-propanol, isopropanol, n-butanol, isobutylalcohol, tert-butylalcohol, isoamylalcohol, 2-methoxyethanol, acetone, ethyl methyl ketone, methyl isobutyl ketone, 2-pentanone, diethylketone; dimethylformamide, dimethyl sulfoxide, acetonitrile, dichloromethane, or mixture thereof.

5. The process as claimed in claim 1, wherein the organic solvent used in step-(iv) is selected from DMF, Dimethyl sulfoxide (DMSO) or mixture thereof.

6. The process as claimed in claim 1, wherein solvent used in purification of step- (v) is selected from water miscible organic solvent and water or mixture thereof.

7. The process as claimed in claim 6, wherein water miscible organic solvent is selected from N,N-dimethylformamide, dimethyl sulfoxide, methanol, ethanol, acetone, acetonitrile, tetrahydrofuran, isopropyl alcohol or mixture thereof.

8. The process as claimed in claim 1, wherein the mole equivalents of 3-mercaptopropionic acid are in between 10 to 20 and the mole equivalents of sodium base are in between 20 to 40 with respect to bromo-γ-cyclodextrin of formula-(VI).

9. The process as claimed in claim 1, wherein the known impurities are selected from sulfoxide impurity, α-Sugammadex sodium, β-Sugammadex sodium and monohydroxy Sugammadex sodium.

10. A Crystalline Form of Sugammadex sodium obtained by the process according to claim 1, wherein the crystalline form of Sugammadex is designated as Form-N having an X-ray powder diffraction pattern comprising the following 2θ values measured using CuKα radiation: 5.6, 10.1, 11.9 and 21.9±0.2°.

11. The crystalline Form as claimed in claim 10, wherein the X-ray powder diffraction pattern further comprises the following 2θ values measured using CuKα radiation: 5.9, 7.4, 8.4, 17.9 and 18.9±0.2°.

12. The process of claim 1, wherein the process is a process for the preparation of crystalline Form-N of Sugammadex sodium, and wherein the process further comprises:
   a) precipitating the obtained Sugammadex sodium from aqueous solution using ethanol,
   b) filtering precipitated Sugammadex sodium obtained in step (a),
   c) drying the wet Sugammadex sodium obtained in step (b) at temperature ranging from 20° C. to 100° C. to obtain crystalline Form-N of Sugammadex sodium.

13. A pharmaceutical composition comprising the crystalline Form-N of Sugammadex sodium according to claim 10 or claim 11, or the crystalline Form-N of Sugammadex sodium obtained by the process according to claim 12, and a pharmaceutically acceptable carrier.

\* \* \* \* \*